United States Patent
Takase et al.

(10) Patent No.: US 7,896,956 B2
(45) Date of Patent: Mar. 1, 2011

(54) METHOD FOR REGENERATING FILTER AND APPARATUS THEREOF

(75) Inventors: Soken Takase, Nagasaki (JP); Yoshinori Koyama, Nagasaki (JP); Osamu Shinada, Nagasaki (JP); Yuichiro Kitagawa, Nagasaki (JP); Ryouji Takahira, Nagasaki (JP); Kazunari Imagama, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 301 days.

(21) Appl. No.: 11/606,011

(22) Filed: Nov. 30, 2006

(65) Prior Publication Data
US 2008/0127824 A1 Jun. 5, 2008

(51) Int. Cl.
*B01D 46/00* (2006.01)

(52) U.S. Cl. ............... 95/278; 95/283; 55/282.3; 48/77; 48/210; 110/345

(58) Field of Classification Search ............... 95/278, 95/279, 280, 283; 55/282.2, 282.3, 283, 55/288, 301, 302, 303; 48/77, 210; 110/345
See application file for complete search history.

(56) References Cited

U.S. PATENT DOCUMENTS

| | | | | |
|---|---|---|---|---|
| 4,153,427 A | * | 5/1979 | Bissett et al. | 48/86 R |
| 4,186,694 A | * | 2/1980 | Koseki | 123/41.31 |
| 4,851,015 A | * | 7/1989 | Wagner et al. | 95/15 |
| 5,073,178 A | * | 12/1991 | Mimori et al. | 55/523 |
| 5,090,200 A | * | 2/1992 | Arai | 60/286 |
| 5,105,619 A | * | 4/1992 | Arai | 60/286 |
| 5,198,006 A | * | 3/1993 | Mimori et al. | 55/523 |
| 5,221,484 A | * | 6/1993 | Goldsmith et al. | 210/650 |
| 5,243,922 A | * | 9/1993 | Rehmat et al. | 110/233 |
| 5,254,144 A | * | 10/1993 | Provol | 95/280 |
| 5,305,602 A | * | 4/1994 | Kojima et al. | 60/286 |
| 5,347,809 A | * | 9/1994 | Moeckel et al. | 60/274 |
| 5,433,771 A | * | 7/1995 | Bachovchin et al. | 95/280 |
| 5,458,673 A | * | 10/1995 | Kojima et al. | 95/11 |
| 5,853,459 A | * | 12/1998 | Kuwamoto et al. | 95/273 |
| 5,922,090 A | * | 7/1999 | Fujimura et al. | 48/197 R |
| 6,056,796 A | * | 5/2000 | Chiang et al. | 55/302 |
| 6,077,490 A | * | 6/2000 | McIlroy et al. | 423/215.5 |
| 6,167,691 B1 | * | 1/2001 | Yoshikawa et al. | 60/39.12 |
| 6,212,872 B1 | * | 4/2001 | Abe et al. | 60/39.182 |
| 6,676,716 B2 | * | 1/2004 | Fujimura et al. | 48/197 FM |
| 6,845,314 B2 | * | 1/2005 | Fosseen | 701/114 |

(Continued)

FOREIGN PATENT DOCUMENTS

JP 08309151 A * 11/1996

*Primary Examiner* — Michael A Marcheschi
*Assistant Examiner* — Robert A Clemente
(74) *Attorney, Agent, or Firm* — Manabu Kanesaka; Benjamin Hauptman; Kenneth Berner (57) ABSTRACT

A filter regeneration apparatus of a coal gasification system having a filter for capturing char (unburned matter) present in exhaust gas at an exhaust gas passage communicating with exhaust gas source including a coal gasification furnace, fills the filter container with inactive gas having oxygen concentration of less than 5 vol. % and heat the filter to a target temperature of 400 to 450° C. and feed ashing gas having oxygen concentration of 5 to 15 vol. %, thereby ashing char in the filter. This method and apparatus achieve ashing of char in a safe manner and shortens the time of regenerating the filter by controlling the oxygen concentration in the ashing gas and the filter temperature constantly to reach preset target values.

14 Claims, 6 Drawing Sheets

U.S. PATENT DOCUMENTS

| | | | |
|---|---|---|---|
| 6,966,190 B2 * | 11/2005 | Wylie | 60/780 |
| 6,969,413 B2 * | 11/2005 | Yahata et al. | 55/282.3 |
| 7,037,615 B2 * | 5/2006 | Grieve et al. | 429/34 |
| 2005/0160710 A1 * | 7/2005 | Taoka et al. | 55/523 |
| 2006/0059877 A1 * | 3/2006 | Yoshida | 55/523 |
| 2006/0288678 A1 * | 12/2006 | Yoshida | 55/523 |

* cited by examiner

METHOD FOR REGENERATING FILTER AND APPARATUS THEREOF

BACKGROUND OF THE INVENTION

1. Field of the Invention

The present invention relates to a method for regenerating a filter of a coal gasification system being equipped with a filter for removing char (unburned matter) in exhaust gas at an exhaust gas passage communicating with exhaust gas source including a coal gasification furnace of the coal gasification system.

2. Description of the Related Art

In an integrated coal gasification combined power-generating unit having a coal gasification furnace, a porous filter for removing char (unburned matter) remaining in gas produced in the coal gasification furnace. In the normal operation of the coal gasification furnace, char captured by the porous filter is backwashed with compressed nitrogen and the backwashed char is recovered into a hopper and returned to the coal gasification furnace.

The life of a porous filter is determined by the increase of airflow resistance on an element inside the porous filter. The porous filters which are used in the backwash treatment as described above usually last about two years. Thus, there are various methods for regenerating the porous filters which have reached the end of the product life.

For example, JP8-309151A published on Nov. 26, 1996 (hereinafter referred to as Publication 1) teaches a regeneration method of a porous filter which removes dust in exhaust gas which is applied to a diesel engine and not a coal gasification furnace.

Publication 1 discloses a method of regenerating the porous filter, wherein exhaust gas is introduced into a denitration-catalytic ceramic filter house, the filtered exhaust gas is circulated to the upstream of the filter, the exhaust gas is adjusted to contain 5-20 vol. % oxygen (hereinafter vol. % is used to describe volume percentage) and at 80-400° C., the adjusted exhaust gas is passed gradually through the filter, thus to remove unburned carbon adhered on the filter element by oxidation reaction.

Unlike exhaust gas of a diesel engine, regeneration of a porous filter for removing char present in product gas inside a coal gasification furnace requires a safe removal of char containing a few percent of volatile which is specific to coal gas.

Especially, when regenerating a porous filter used in a coal gasification furnace, coal gas containing oxygen is introduced into the porous filter, and the char is ashed (oxidized) by bringing the temperature inside the porous filter up to a prescribed heating temperature. IN order to adopt the regeneration method of Publication 1 in a coal gasification system, there are following problems.

The char present in product gas inside the porous filter used in a coal gasification furnace contains a few percent of volatile. Therefore, if the gas containing 20 vol. % oxygen is introduced as described in Publication 1, due to a large amount of oxygen contained in the gas, combustion of char volatile can cause the explosion in the porous filter during the regeneration process. It becomes impossible to safely regenerate the porous filter.

In the case of the diesel engine, the exhaust gas of high temperature is circulated to regenerate the porous filter. However, in the coal gasification furnace, the operation of the furnace is stopped and gas of comparatively low temperature is used for regenerating the porous filter and thus it is difficult to ash char by using the low temperature gas under a temperature of 80-400° C.

SUMMARY OF THE INVENTION

In view of the problems of the prior art, the present invention provides a method and an apparatus for regenerating a filter used in a coal gasification system, wherein oxygen concentration in ash gas and filter temperature are constantly controlled to meet target values, char captured by the filter is completely burned to ash (ashed) in a safe manner, and the time of regenerating the filter is shortened.

To achieve the objects of the present invention, the filter regeneration method comprises the steps of: filling the filter with inactive gas having oxygen concentration of less than 5 vol. %; heating the filter so that the filter temperature is maintained in the range of 400 to 450° C.; feeding into the filter the ashing gas which is adjusted to have oxygen concentration of 5 to 15 vol. % which is lower than oxygen concentration in the air (20 vol. %); and ashing (oxidizing) the char in the filter.

In order to perform the aforesaid regeneration method, the present invention provides a filter regeneration apparatus of a coal gasification system having a filter for capturing char (unburned matter) present in exhaust gas at an exhaust gas passage communicating with exhaust gas source including a coal gasification furnace comprising;

filling means for filling the filter with inactive gas having oxygen concentration of less than 5 vol. %; heating means for heating the filter such that the filter temperature is maintained 400 to 450° C.; feeding means for feeding into the filter the ashing gas which is adjusted to have oxygen concentration of 5 to 15 vol. %; and setting means for setting cutting-off timing of the ashing gas supply in synchronization with finishing timing of char ashing (oxidizing) in the filter.

Specifically the filter regeneration apparatus comprises a heating means for heating the filter; an oximeter for measuring oxygen concentration at the inlet of ashing gas; ashing gas oxygen adjusting means for adjusting oxygen concentration in the ashing gas; temperature measuring means for measuring a temperature in the filter; and a controller for controlling thermal dose of the heating means to heat the filter to 400 to 450° C. based on inputted filter temperature which is measured by the temperature measuring means and controlling the adjusting means so that oxygen concentration in the ashing gas meets a target oxygen concentration of 5 to 15 vol. % based on the measured oxygen concentration.

According to the present invention, in the filter regeneration process, after filling the inside of the filter with inactive gas, heating means such as an electric heater heats the filter to a temperature of 400 to 450° C., and ashing gas is adjusted to have oxygen concentration of 5 to 15 vol. % which is lower than the that of the air and the adjusted ashing gas is fed into the filter via a ashing gas passage, and the char captured in a filter element of the filter is ashed.

Chemical formula of char ashing (oxidization) is $$C + O_2 \rightarrow CO_2$$

The above oxidization is smoothly stimulated when the filter temperature is 400 to 450° C.

Furthermore, when oxygen concentration in the ashing gas is lower than 5 vol. %, chemical formula is $2C + O_2 \rightarrow 2CO$ and endothermic reaction occurs and the char ashing is not smoothly performed. Thus, the ashing gas needs to be adjusted to have a target oxygen concentration of 5 vol. % and above.

According to the experiments by the inventors, when the heating means such as an electric heater heats the inside of the filter thereby ashing the char captured by the filter element during the filter regeneration process, ashing (oxidizing) of char containing low oxidation-reactive components such as carbon and tar is difficult at a temperature of lower than 400° C. in the filter and also at a temperature of over 450° C. in the filter, damages to filter components such as a filter case and element supporting parts due to overheating are found.

Therefore, according to the present invention, the heating means such as an electric heater, heats the inside of the filter to maintain the target temperature of 400 to 450° C. and char is ashed. Therefore, low oxidation-reactive components in the char can be safely ashed without causing any damage to the filter components to due overheating.

The ashing gas can be fed before the filter is heated to the target temperature, for instance at the beginning of the heating.

According to the experiments by the inventors, in the filter regeneration process, under oxygen concentration of above 15 vol. % (volume percentage) which is near oxygen concentration in the air, explosion of char containing a few percent of volatile occurs. And in the low oxygen atmosphere of under 5 vol. % oxygen concentration which is practically inactive state, ashing of char (unburned matter) does not take place.

Therefore, according to the present invention, the temperature in the filter is maintained in the target range of 400 to 450° C. and oxygen concentration in the ashing gas is set to 5 to 15 vol. %, and char can be completely ashed in a safe manner without inducing explosion of char (unburned matter) in the filter.

Furthermore, according to the present invention, based on the oxygen concentration in the ashing gas and temperature in the filter measured by an oximeter and a temperature sensor, the controller controls a heating means to adjust thermal dose so that the filter is heated to 400 to 450° C., and controls an ashing gas oxygen adjusting means so that oxygen concentration in the ashing gas meets the target concentration, 5 to 15 vol. %, thereby precisely maintaining the temperature of the filter within the target range.

Thus, the times of char ashing in the filter and filter regeneration are shortened.

In the present invention, the regeneration apparatus may have another oximeter at the filter outlet for measuring oxygen concentration at the filter outlet and an ashing gas flow adjusting means for adjusting flow of the ashing gas into the filter, wherein oxygen concentration in the ashing gas is measured at the filter outlet and at least one of the ashing gas flow adjusting means and ashing gas oxygen adjusting means is controlled so that oxygen concentration at the filter outlet reaches the preset target concentration (between 5 and 15 vol. %). Specifically, at a temperature of 400 to 450° C. in the filter, the target oxygen concentration (between 5 and 15 vol. %) is pre-set, which is lower than oxygen concentration in the air and practically not inactive state, and an amount of oxygen being fed to the filter is controlled by controlling at least one of flow amount and oxygen concentration in the ashing gas.

At a temperature of 400 to 450° C. in the filter, oxygen concentration in the ashing gas fed to the filter is detected not enough to enable char ashing, e.g. oxygen concentration at the filter outlet being lower than or near the permissible low limit (5 vol. %) of oxygen concentration, the flow of the ashing gas is increased or oxygen components in the ashing gas fed to the filter is increased in the range that explosion is not induced, thereby improving ashing reaction and shortening the time of regenerating the filter.

On the other hand when oxygen concentration in the ashing gas fed to the filter exceeds the required level for char ashing, e.g. oxygen concentration measured at the filter outlet being higher than or near the permissible upper limit (15 vol. %), the flow of the ashing gas is decreased, thereby suppressing a cooling of the filter by ashing gas and reducing a thermal dose of the filter.

In the present invention the ashing gas being supplied to the filter is cut off and the regeneration of the filter is stopped when at least one of the following cases is detected:
a) differential pressure between the inlet side and outlet side of the filter reaches a target differential pressure;
b) oxygen concentration at the outlet reaches a target oxygen concentration; or
c) CO2 concentration at the filter outlet reaches a target CO2 concentration.

The filter regeneration apparatus of the present invention comprises a differential pressure detecting means for detecting differential pressure in the filter between the inlet side and outlet side, and another oximeter for measuring oxygen concentration at the outlet of the filter, and a CO2 meter for measuring CO2 concentration at the filter outlet, wherein the controller closes the ashing gas flow adjusting means to cut off the ashing gas supplied to the filter when at least one of the following cases is detected:
d) the detected differential pressure inputted from the differential pressure detecting means reaches a preset target differential pressure;
e) the measured oxygen concentration inputted from the oximeter reaches a preset target oxygen concentration; or
f) the measured CO2 concentration inputted from CO2 meter reaches a preset target CO2 concentration.

The progress of the char ashing (regeneration of the filter) correlates with a reduction in differential pressure between the pressures in the filter at the inlet side and outlet side as the differential pressure is caused by the reaction of char C being oxidized with O2 to gas CO2. The differential pressure between the inlet and the outlet of the filter is detected, and when the detected differential pressure (calculated level) reaches the minimum differential pressure $\Delta P0$, it determines that the char ashing is completed.

As the char ashing is a chemical reaction of char C being oxidized with O2 to gas CO2, no further progress of oxidization means that the filter regeneration is completed.

Specifically, when oxygen concentration measured by the oximeter at the filter outlet is not reduced and reaches the preset target concentration (5 to 15 vol. %), CO2 is not produced if no oxidization is taking place due to the completion of the filter regeneration.

When at least one of the above mentioned cases d), e) and f) is detected, an ashing gas inlet valve is automatically closed to cut off the ashing gas supplied to the filter. Thus, it becomes possible to automatically detect that the filter has been regenerated to meet the target status, and then determine the completion of the filter regeneration, thereby shortening the time of regenerating the filter.

It is also preferable to apply a filter regeneration apparatus of the present invention to an integrated coal gasification combined power-generating unit.

BRIEF DESCRIPTION OF THE DRAWINGS

FIG. 5A and FIG. 5B are schematic illustration of the filter backwashing of the present invention.

FIG. 6A and FIG. 6B are illustrations of inside of the porous filter of the present invention.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
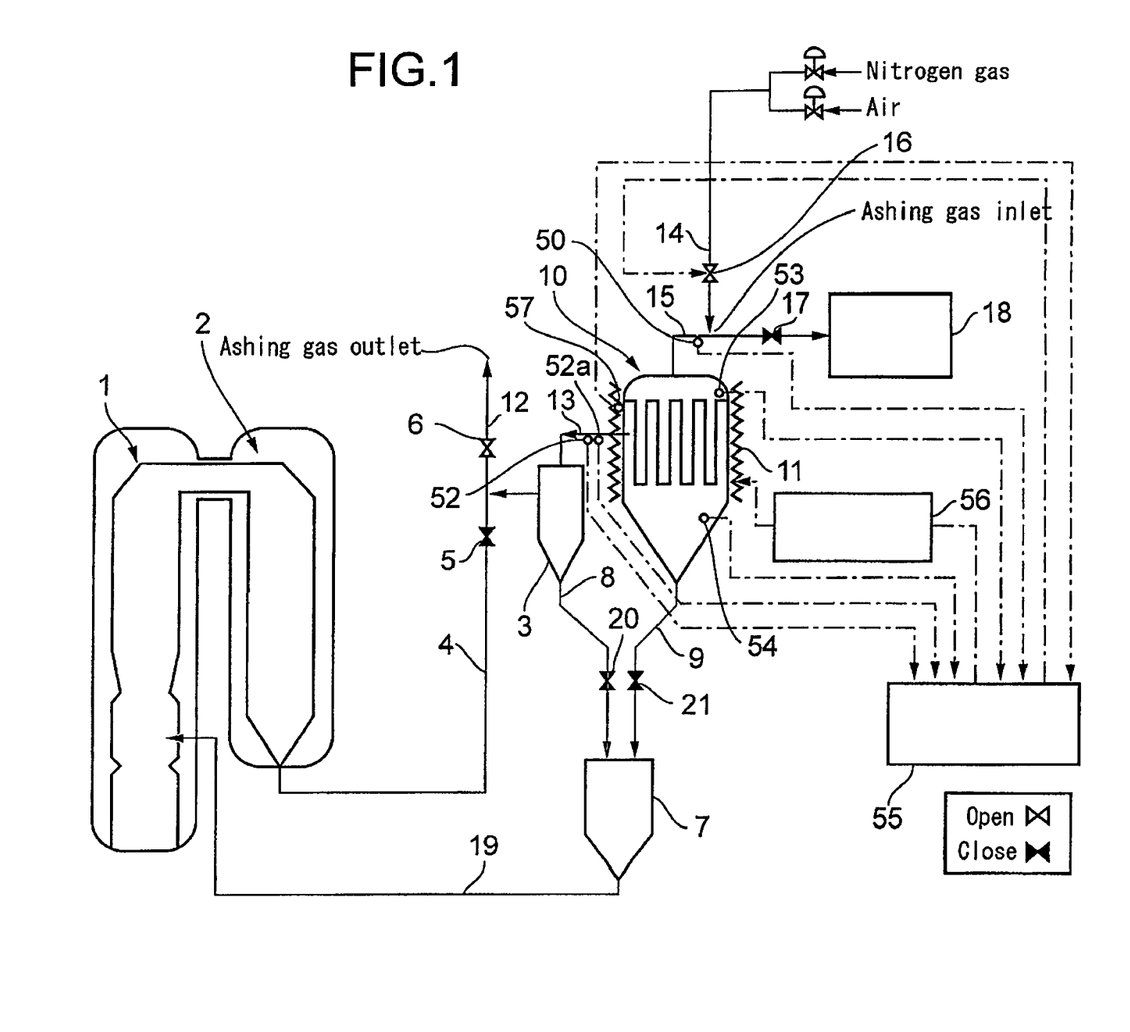
FIG. 1 is a schematic diagram showing an overall view of a coal gasification system of an embodiment of the present invention having a porous filter and the arrow indicates the system of regenerating the porous filter.
Figure 3:
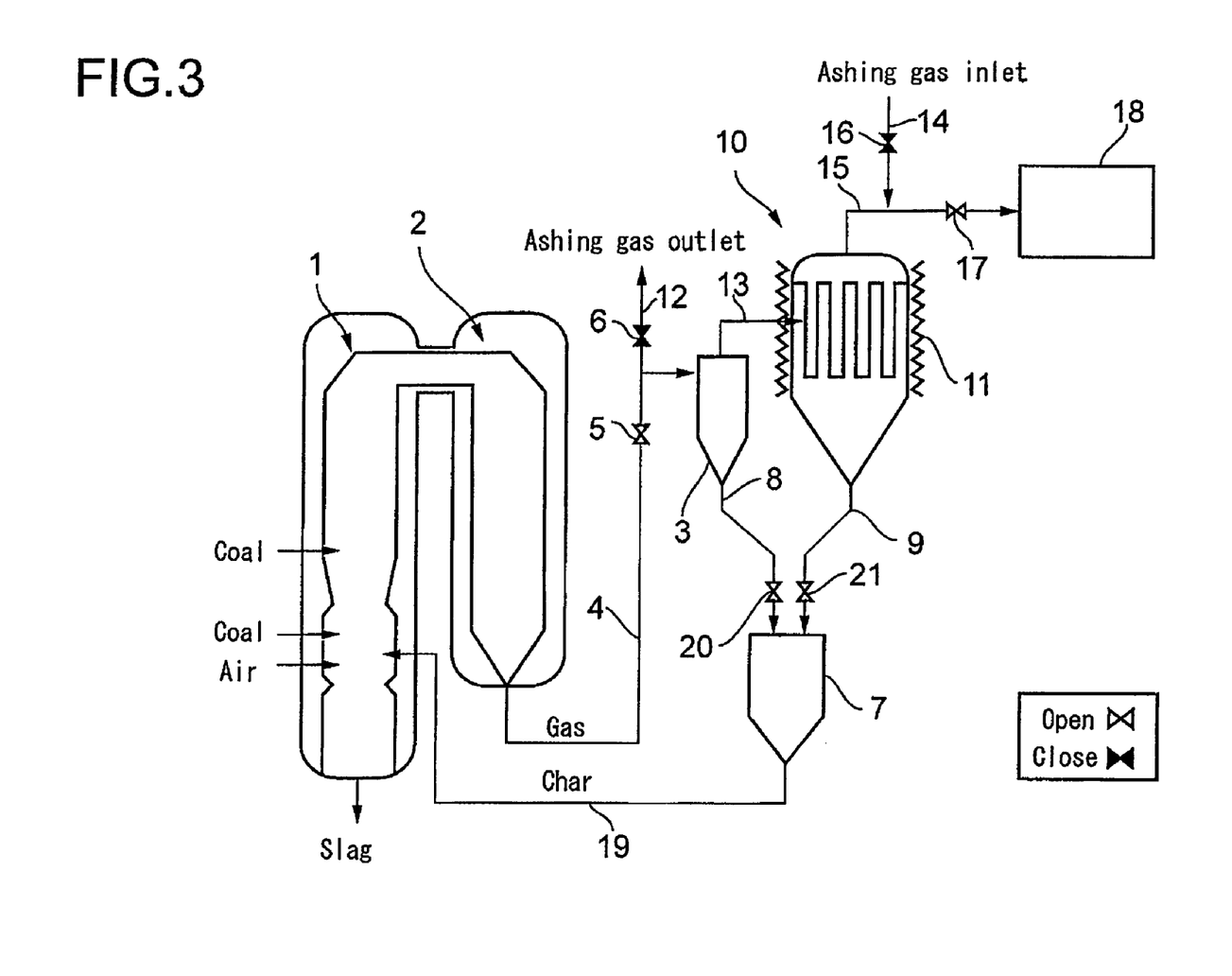
FIG. 3 is a schematic diagram of a coal gasification system in a normal operation mode.

FIG. 1 and FIG. 3 illustrate an overall view of a coal gasification system of an embodiment of the present invention having a porous filter. In FIG. 1 the arrow indicates the system of regenerating the porous filter and in FIG. 3 the arrow indicates the system of the coal gasification system in a normal operation mode.

In FIG. 1 and FIG. 3, are shown a coal gasification furnace 1 for gasifying coal (dust coal), a product gas cooler 2 for cooling the gas produced in the coal gasification furnace, a cyclone 3 for centrifuging char (unburned matter) present in the product gas, a porous filter 10 for capturing the residual char remaining in the product gas after being processed in the cyclone 3, a hopper 7 for storing the char removed by the cyclone 3 and the porous filter 10, and a gas purification device 18.

An electric heater 11 heats the porous filter 10 during the regeneration process which will be described later.

A first gas passage 4 connects the product gas cooler 2 and a gas inlet of the cyclone 3, a second passage 13 connects a gas outlet of the cyclone 3 and a gas inlet of the porous filter 10, and a third gas passage 15 connects a gas outlet of the porous filter 10 and a gas inlet of the gas purification device 18.

The ashing gas is introduced into the porous filter via an ashing gas inlet passage 14 and discharged via an ashing gas outlet passage 12.

A first char passage 8 connects a char outlet of the cyclone 3 and the hopper, a second char passage 9 connects a char outlet of the porous filter 10 and the hopper, and a char return passage 19 connects a char outlet of the hopper and a bottom part of the coal gasification furnace 1.

An ashing gas inlet valve 16 controls the opening and closing of the ashing gas inlet passage 14 to control the flow of the ashing gas. An opening/closing valve 17 controls the opening and closing of the downstream passage of the third gas passage 15 lower than the merging point of the ashing gas inlet passage 14. An ashing gas outlet valve 6 controls the opening and closing of the ashing gas outlet passage 12. Another opening/closing valve 5 controls the opening and closing of the first gas passage 4 which merges into the inlet passage of the cyclone 3.

An opening/closing valve 20 controls the opening and closing of the first char passage 8 from the cyclone 3 and an opening/closing valve 21 controls the opening and closing of the second char passage 9 from the porous filter 10.

As shown in FIG. 3, during the normal operation of the coal gasification system, the opening/closing valves 5, 17 of the first and third gas passages 4, 15 are opened, and the opening/closing valves 20, 21 of the char passages 8, 9 are opened, and the ashing gas inlet valve 16 and outlet valve 6 are closed.

During the normal operation of the coal gasification system in the state of the valves as described above, the gas (hereinafter referred to as product gas) is produced during the gasification of coal (dust coal) with the air in the coal gasification furnace 1, the product gas is cooled to approximately 450° C. in the cooler 2, and the cooled product gas is fed via the first gas passage 4 into the cyclone 3 in which char of comparatively large particle is centrifuged.

The centrifuged product gas is fed via the second gas passage 13 into the porous filter 10 in which residual char remaining in the product gas is removed and then fed to the gas purification device 18.

Moreover, the char of large particle which is removed by the cyclone 3 is stored in the hopper 7 via the first char passage 8, the char removed by the porous filter 10 is stored in the hopper 7 via the second char passage 9. The char stored in the hopper 7 is returned to the coal gasification furnace 1 via the char return passage 19.

Next, FIG. 1 illustrates the regeneration process of the porous filter 10. In FIG. 1 are provided an inlet oximeter 50 for measuring oxygen concentration in the ashing gas being supplied to the filter 10 at the filter inlet, an outlet oximeter 52 for measuring oxygen concentration in the ashing gas at the filter outlet, a CO2 meter 52a for measuring CO2 concentration in the ashing gas at the filter outlet, a temperature sensor 57 for measuring a temperature of the filter 10 (filter container temperature), an inlet pressure meter 53 for measuring the pressure at the ashing gas inlet side in the porous filter 10, and an outlet pressure meter 54 for measuring the pressure at the ashing gas outlet side in the porous filter 10.

A controller 55 calculates and controls in a manner described below based on the measured oxygen concentration at the filter inlet and outlet which is inputted from the oximeters 50 and 52; the measured CO2 concentration inputted from the CO2 meter 52a at the outlet of the porous filter 10; the measured temperature of the porous filter container inputted from the temperature sensor 57; and the measured pressures in the filter at the ashing inlet side and outlet side inputted from the pressure meter 53 and 54.

A heat controller 56 controls the current of the electric heater 11 according to the control signal from the controller 55.

As shown in FIG. 1, during the regeneration process of the porous filter 10, the operation of the furnace is stopped, and the opening/closing valves 5, 17 of the first and third gas passages 4, 15 are closed, and the opening/closing valves 20, 21 of the char passages 8, 9 are closed.

Next, when the porous filter is not heated, the ashing gas inlet valve 16 and outlet valve 6 are opened, and nitrogen gas (inactive gas whose oxygen concentration is 5 vol. % and below) is fed via the ashing gas inlet passage 14 into the porous filter 10 to fill the porous filter 10 in a non-heating state.

Further, when the operation of the coal gasification system is stopped for inspection or the like, nitrogen gas is usually used to fill inside of the system for safety. By utilizing this condition, the operation described below can be performed without providing inactive gas separately.

Then, the ashing gas inlet valve 16 and outlet valve 4 are closed once, the controller 55 controls the heat controller 56 to pass the current to the electric heater 11, and then the electric heater 11 heats the porous filter 10 so that the container temperature is within the range of 400 to 450° C. The temperature in the porous filter 10 is controlled by the controller to be in the target range of 400 to 450° C. by controlling the current of the electric heater 11 by means of the heat controller 56 based on the filter container temperature measured by the temperature sensor 57.

Figure 2:
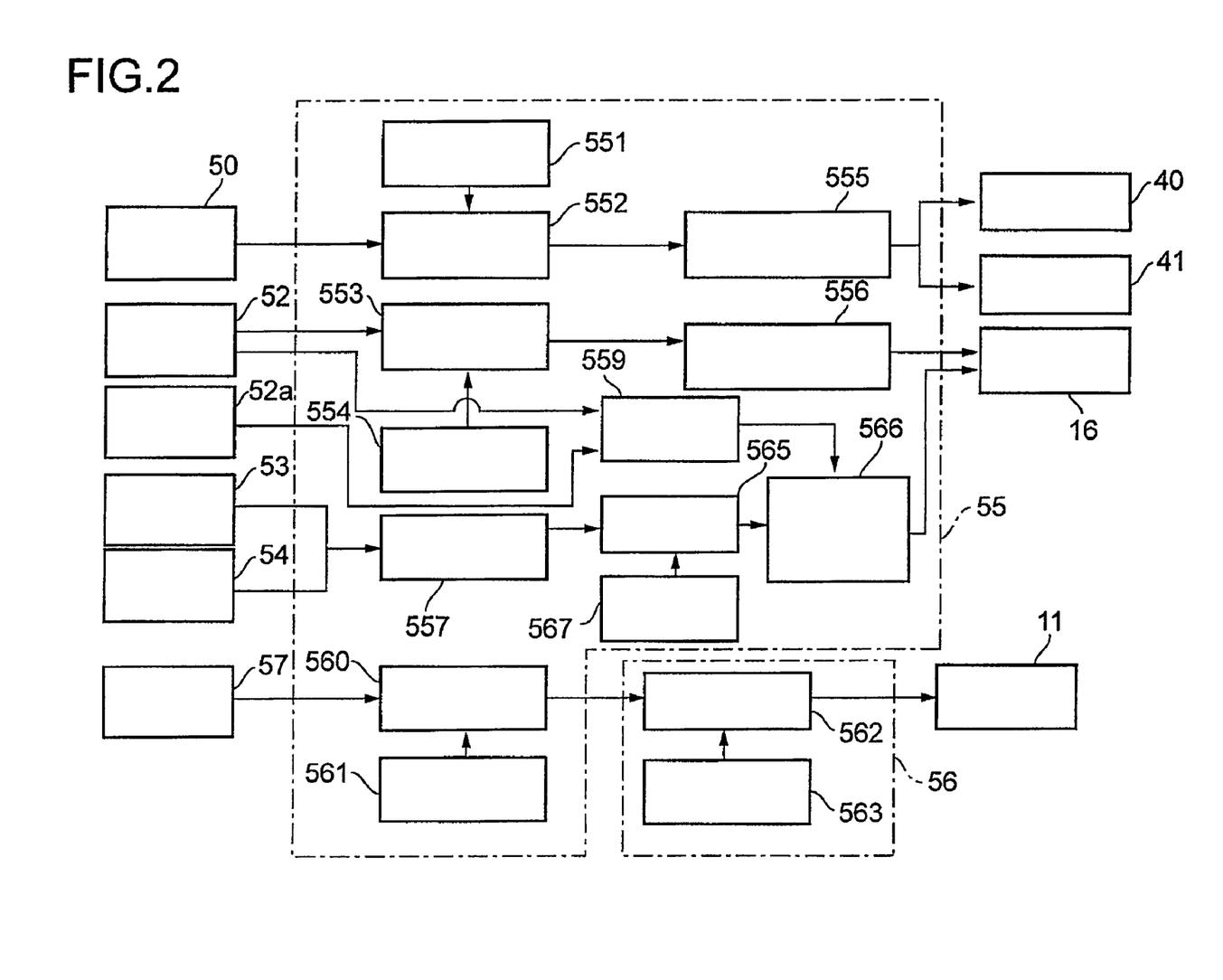
FIG. 2 is a block diagram of a porous filter regeneration apparatus of the embodiment.

Specifically, as shown in FIG. 2, a temperature comparison part 560 of the controller 55 compares the temperature of the filter container measured by the temperature sensor 57 and the target temperature range which is pre-set in a temperature setting part 561, and the obtained temperature deviation is inputted to a current calculation part 562 of the heat controller 56.

The current calculation part 562 calculates an adjustment amount of the current corresponding to the temperature deviation based on the relation of the container temperature in the porous filter 10 and the current of the electric heater which is pre-set in a current/temperature setting part 563, and controls the current of the electric heater according to the calculated adjustment amount. The container temperature in the porous filter is maintained in the target range (400 to 450° C.).

Therefore, by the feedback control of the temperature in the porous filter 10, the temperature of the porous filter is maintained in the target range (400 to 450° C.) with precision. In this case, the temperature inside the filter is slightly lower than the temperature of the filter container.

Once the temperature of the porous filter container stabilizes in the target range (400 to 450° C.), the ashing gas inlet valve 16 is opened, the ashing gas consisting of nitrogen-oxygen mix gas which is adjusted to have the target oxygen concentration of 5 to 15 vol. %, preferably 10 vol. %, is introduced via the inlet passage 14 into the porous filter, and char captured by the porous filter element is ashed in the porous filter 10 which is maintained in the target temperature range (400 to 450° C.).

Specifically, as shown in FIG. 2, an inlet oxygen concentration comparison part 552 of the controller 55 compares the oxygen concentration at filter inlet measured by the inlet oximeter and the target oxygen concentration of 10 vol. % which is pre-set in an inlet oxygen concentration setting part 551, and the obtained deviation of oxygen concentration is inputted to an oxygen concentration adjustment determining part 555 for determining the adjusting amount of oxygen concentration in ashing gas.

The oxygen concentration adjustment determining part 555 determines the adjusting amount of nitrogen and oxygen corresponding to the deviation of inlet oxygen concentration, and outputs to a nitrogen valve 40 and an oxygen valve 41.

Furthermore, an outlet oxygen concentration comparison part 553 compares the oxygen concentration at the filter outlet measured by the outlet oximeter 52 and the target outlet oxygen concentration which is pre-set in an outlet oxygen concentration setting part 554, and the obtained deviation of outlet oxygen concentration is input to an ashing gas flow adjustment determining part 556. The target outlet oxygen concentration is preferably a permissible lower limit at the outlet oximeter.

The ashing gas flow adjustment determining part 556 calculates the adjusting opening of the ashing gas inlet valve 16 corresponding to the obtained deviation of outlet oxygen concentration, and outputs to the ashing gas inlet valve 16. Thus, the opening of the ashing gas inlet valve 16 is adjusted in the adjusting amount calculated by the part 556, corresponding to the preset target outlet oxygen concentration. When the outlet oximeter measures the level lower than the permissible lower limit (e.g. present level is set from the range of 5 to 10 vol. %), the ashing gas inlet valve 16 is opened wider so that the amount of the ashing gas increases thus to increase absolute oxygen concentration.

The opening of the nitrogen valve and oxygen valve can be calculated and outputted to the valves such that the opening of the valves are adjusted corresponding to the preset target outlet oxygen concentration.

The nitrogen valve and the oxygen valve can be flow regulating valves for regulating flow by adjusting the opening or simple opening/closing valves, in order to adjust the flow corresponding to the preset target outlet oxygen concentration.

By the feedback-control of the oxygen concentration of the porous filter 10, the oxygen concentration in the ashing gas inside the porous filter is constantly maintained higher than the permissible lower limit.

When the oxygen concentration at the filter outlet is detected lower than the lower limit, it indicates that the oxygen is scarce inside the porous filter container due to progression of char ashing. Therefore, the amount of oxygen inside the porous filter container needs to be increased by increasing the ashing gas or oxygen concentration in the ashing gas within the range that the explosion would not occur, thereby shortening the time of ashing process.

The end of the regeneration process of the porous filter 10 is determined as follows.

As shown in FIG. 2, the inlet and outlet pressure meters 53, 54 measure pressures at the filter inlet and outlet respectively, and the measured pressure levels are inputted to a differential pressure calculation part 557 of the controller 55. The differential pressure calculation part 557 calculate differential pressure of the porous filter 10 (pressure at the filter inlet— pressure at the filter outlet) and output the calculated differential pressure to a differential pressure comparison part 565.

The differential pressure comparison part 565 compares the calculated differential pressure and a minimum differential pressure $\Delta P0$ (referenced in FIG. 4B) which is pre-set in a minimum differential pressure setting part 567, and inputs the comparison result to a valve cut-off determining part 566 for determining the cut-off of the ashing gas inlet valve.

The oxygen concentration and CO2 concentration measured at the filter outlet by the outlet oximeter 52 and CO2 meter 52a respectively are inputted to an outlet concentration calculation part 559 of the controller 55.

The porous filter 10 is regenerated by ashing the char in which the char C is oxidized with O2 to gas CO2.

Figure 4A:
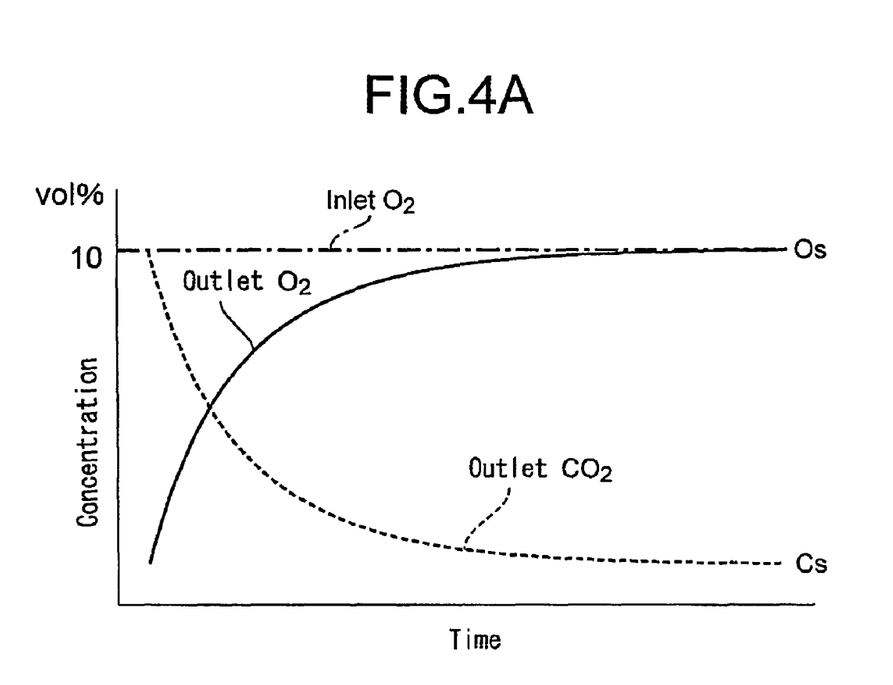
FIG. 4A illustrates deviations of measured oxygen concentration and CO2 concentration in the ashing gas and FIG. 4B illustrates deviations of measured differential pressure in the filter at a temperature of 400-450° C. in the filter in the case of feeding the ashing gas containing 10 vol. % oxygen concentration into the filter.
Figure 4B:
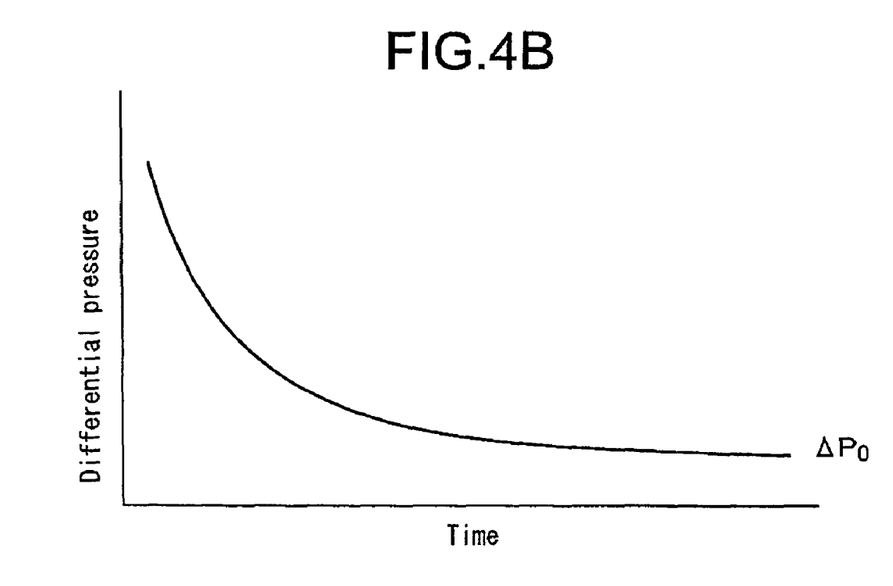

If there is no progress of the oxidization, it determines that the regeneration of the filter is completed. Therefore, as shown in FIG. 4A when the ashing gas having oxygen concentration of 10 vol. % (measured by the inlet oximeter 50) is introduced into the porous filter 10 via the ashing gas inlet valve 16, initial decrease of oxygen concentration is detected at the filter outlet due to the progression of oxidization (measured by the outlet oximeter 52). However, as the regeneration is getting saturated, the oxygen concentration at the outlet (measured by the outlet oximeter 52) reaches the level measured by the inlet oximeter 50.

Furthermore, as shown in FIG. 4A when the oxidization occurs, the outlet CO2 concentration (measured by the CO2 meter 52a) becomes higher. However, as the regeneration of the porous filter is getting saturated, the CO2 concentration becomes closer to the minimum level of CO2 concentration (approximately 0 vol. %), which indicates the progress of char ashing.

A target cut-off oxygen concentration Os and a target cut-off CO2 concentration Cs are set in the outlet concentration calculation part 559, which are the cut-off conditions for closing the ashing gas inlet valve 16 and cutting off the ashing gas supply to the porous filter 10. The target cut-off oxygen concentration Os is set to be the target oxygen concentration (the inlet oxygen set value) and the target cut-off CO2 concentration Cs is set to be the minimum level of CO2 concentration (approximately 0 vol. %). Specifically, once the measured oxygen concentration and CO2 concentration are inputted to the outlet concentration calculation part 559, the outlet concentration calculation part 559 compares the measured levels of oxygen and CO2 concentration and the target cut-off levels Os and Cs of oxygen and CO2 concentrations, inputting the comparison result to the valve cut-off determining part 566, and cutting off the supply of the ashing gas to the porous filter 10 as described later.

The progress of the char ashing (regeneration of the filter) correlates with a reduction in differential pressure between the pressures at the filter inlet and outlet measured by the pressure meters 53, 54 as the differential pressure is caused by the reaction of char C being oxidized with O2 to gas CO2. The differential pressure between the filter inlet and outlet is detected, and when the detected differential pressure (calculated level) reaches the minimum differential pressure $\Delta P0$, it determines that the char ashing is completed.

In this embodiment, in the valve cut-off determining part 566 the detected differential pressure (calculated level) reaches s the minimum differential pressure $\Delta P0$, or the measured outlet oxygen concentration reaches the target cut-off oxygen concentration Os, the ashing gas inlet valve 16 is closed and the supply of ashing gas to the porous filter is cut off.

With this configuration, the inlet pressure meter 53 and the outlet pressure meter 54 measure the differential pressure between the filter inlet and outlet, the outlet oximeter 52 measures oxygen concentration at the filter outlet, the outlet CO2 meter 52a measure CO2 concentration at the filter outlet, the controller 55 detects that the measured differential pressure reaches the preset target differential pressure which is the minimum differential pressure $\Delta P0$, or the measured oxygen concentration reaches the preset target cut-off oxygen concentration Os, or the measured CO2 concentration reaches the preset target cut-off CO2 concentration Cs, the ashing gas inlet valve 16 is automatically closed and the supply of ashing gas to the porous filter 10 is cut off. The controller 55 detects automatically that the regeneration of the porous filter 10 reached the target state and determines the cut-off timing of the regeneration of the filter, thereby shortening the time of regenerating the filter.

After the porous filter 10 is regenerated in the manner described above, the porous filter is backwashed in the following manner.

Figures 5A, 5B:
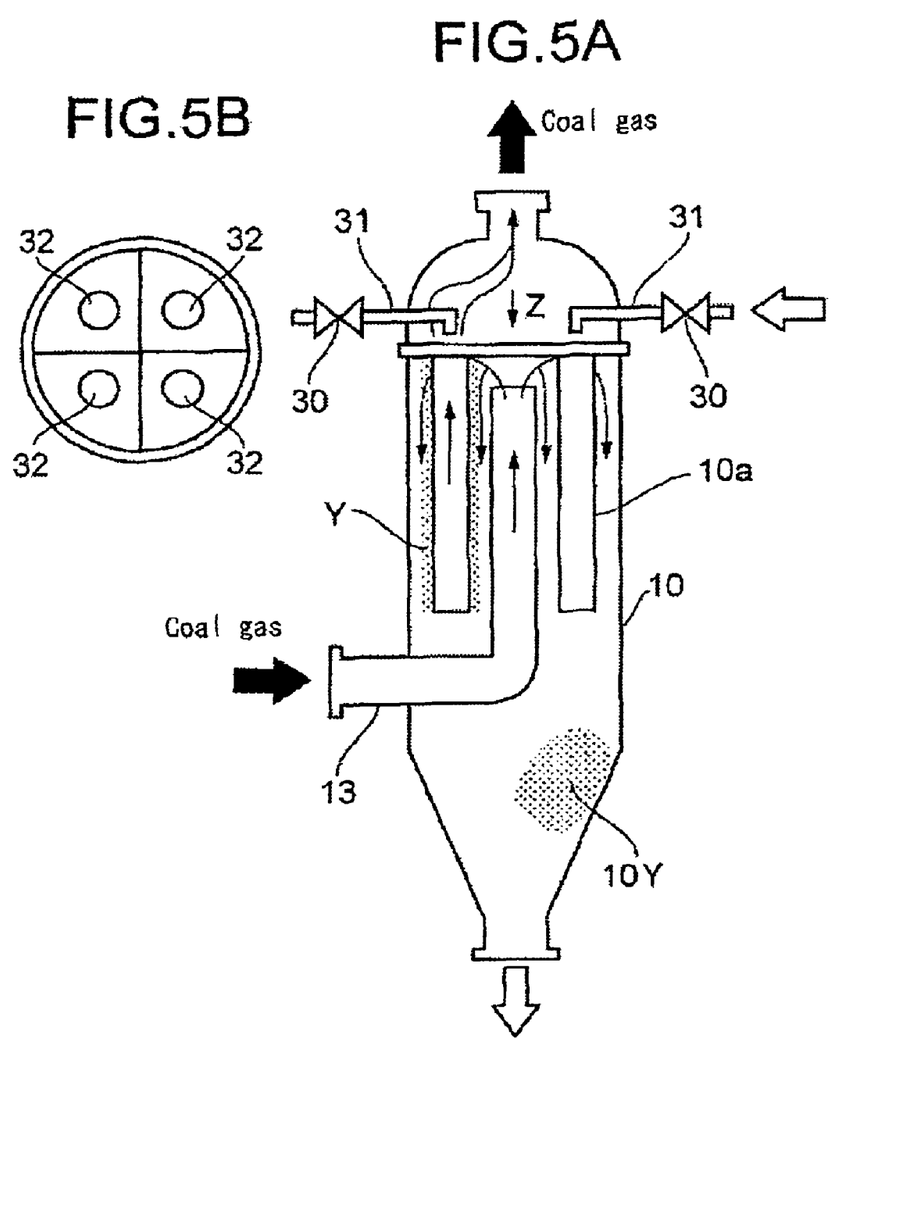
FIG. 5A is a longitudinal sectional view and FIG. 5B is a sectional view taking by the arrow Z.

FIG. 5A and FIG. 5B are schematic illustration of the filter backwashing of the embodiment. FIG. 5A is a longitudinal sectional view and FIG. 5B is a sectional view taking by the arrow Z.

In FIG. 5A, the porous filter 10 comprises filter elements 10a, a plurality of backwash gas passages 32 (4 passages in this embodiment) provided above the elements 10a as illustrated in FIG. 5B, backwash gas pipes 31 for introducing compressed nitrogen as backwash gas, open/close valves 30 for opening and closing the backwash gas pipes 31 and a gas passage 13 at the inlet side.

Figure 6A:
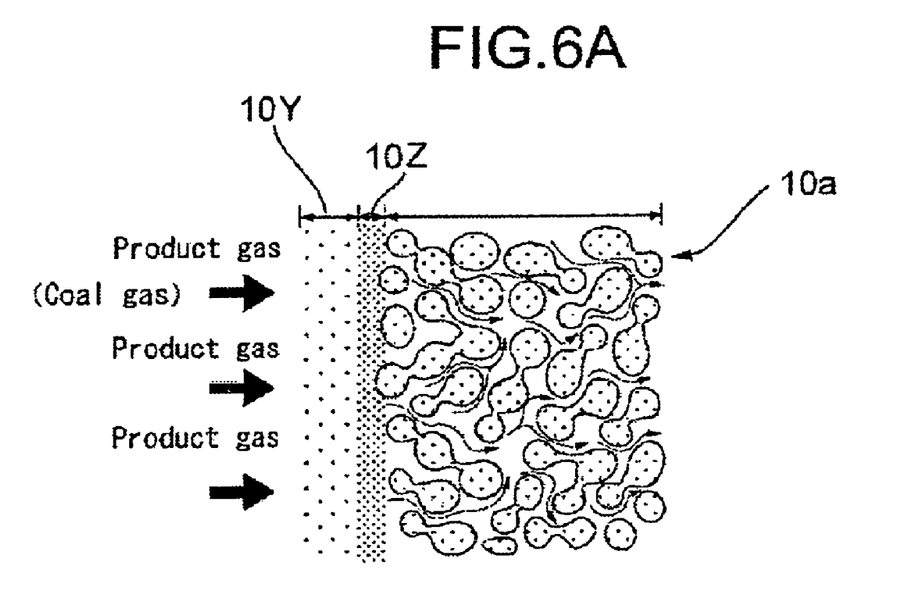
FIG. 6A illustrates a normal operation mode and FIG. 6B illustrates a backwash mode.
Figure 6B:
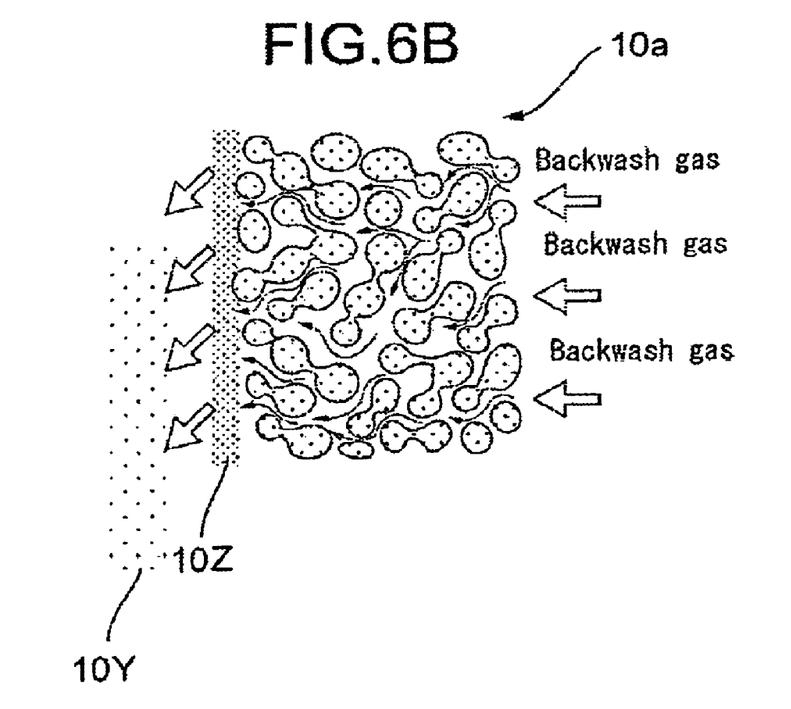

FIG. 6A and FIG. 6B illustrate the comparison of dust accumulation before and after a backwash process. FIG. 6A illustrates a normal operation mode in which an adhered dust layer 10Y is on a permanent dust layer 10Z in the filter element 10a.

In the backwash process of the porous filter 10, compressed nitrogen is introduced from the backwash pipes 31 into the filter, the compressed nitrogen is spewed against the elements 10a via the backwash gas passages 32, and the adhered dust layer 10Y is removed from the element 10a. The removed adhered dust layer 10Y is returned to the coal gasification furnace 1 via the char return channel 19 (shown in FIG. 1) along with the char.

As shown in FIG. 6B, the adhered dust layer 10Y is removed from the element 10a by the backwash, only the permanent dust layer 10Z remains on the surface of the element 10a.

The adhered dust layer 10Y can be removed by regenerating the porous filter 10 in the manner describe above. However, the regeneration of the filter 10 causes the char (ash element in the layer 10Z) which is produced during the regeneration process to adhere on the surface of the element 10a. Further backwash process can remove the ashed char adhered on the element 10a, thereby regenerating the porous filter to near brand-new state.

According to the present invention, in the porous filter of the coal gasification furnace, oxygen concentration in ashing gas and the filter temperature are controlled to reach the target levels, char captured by the filter is ashed in a safe manner, and the time of regenerating the filter is shortened.

Moreover, as the temperature in the filter is maintained in the target range, 400 to 450° C. by a heating means such as an electric heater, char is completely ashed in a safe manner and even low oxidation-reactive components present in the char are completely ashed. And the oxygen concentration in the ashing gas is set to be the target concentration which is 5 to 15 vol. % so that char is ashed in a safe manner without inducing explosion of char (unburned matter) in the filter.

Furthermore, the flow amount and oxygen concentration in the ashing gas is adjusted based on the oxygen concentration measured at the filter outlet so that an adequate amount of oxygen components is supplied to the filter and the time of regenerating the filter is shortened.

According to the present invention, in the case of at least one of the measured differential pressure between the filter inlet and outlet reaching the preset target differential pressure; the measured oxygen concentration reaching the preset target oxygen concentration; or the measured CO2 concentration reaching the preset target CO2 concentration Cs, the ashing gas inlet valve 16 is automatically closed and the supply of ashing gas to the porous filter 10 is cut off. Thus, it is automatically detected that the regeneration of the porous filter 10 reached the target state and determines the cut-off timing of the regeneration of the filter, thereby shortening the time of regenerating the filter.

Furthermore, an integrated coal gasification combined power-generating unit to which a filter regeneration apparatus of the present invention is applied enables a safe regeneration of the filter in a short amount of time, thereby shortening the shutdown period of the power-generating unit.

The invention claimed is:

1. A method for regenerating a filter in a coal gasification system for capturing char present in exhaust gas at an exhaust gas passage communicating with an exhaust gas source including a coal gasification furnace, the regeneration method comprising the steps of:

filling the filter with an inactive gas having an oxygen concentration of less than 5 vol. %;

heating the filter so that the filter temperature is maintained at 400 to 450° C.;

feeding into the filter ashing gas which is adjusted to have an oxygen concentration of 5 to 15 vol. %, thereby ashing the char in the filter, measuring the oxygen concentration in the ashing gas at a filter outlet; and controlling at least one of flow and oxygen concentration in the ashing gas so that the oxygen concentration measured at the filter outlet reaches a preset target concentration.

2. A method for regenerating a filter according to claim 1, further comprising the steps of:

cutting off the ashing gas being supplied to the filter and finishing regeneration of the filter when at least one of the following cases is detected:

a) a differential pressure in the filter between an inlet side and an outlet side reaches a target differential pressure;

b) the oxygen concentration at the filter outlet reaches a target oxygen concentration; or c) a $CO_2$ concentration at the filter outlet reaches a target $CO_2$ concentration.

3. A filter regeneration apparatus of a coal gasification system having a filter for capturing char present in exhaust gas at an exhaust gas passage communicating with an exhaust gas source including a coal gasification furnace; the filter regeneration apparatus comprising:

temperature measuring means for measuring an internal temperature of the filter;

filling means for filling the filter with inactive gas having oxygen concentration of less than 5 vol. %;

heating means for heating the filter which is filled with the inactive gas based on the measured internal temperature of the filter so that the internal temperature of the filter is maintained at 400 to 450° C.;

oxidizing means for oxidizing char inside the filter by feeding ashing gas which is adjusted to have oxygen concentration of 5 to 15 vol. % into the filter;

$O_2$ concentration measuring means for measuring oxygen concentration in the ashing gas at a filter outlet; and a controller for controlling at least one of a flow of the ashing gas and an oxygen concentration in the ashing gas so that a measured value of the oxygen concentration reaches a preset target concentration;

wherein the filter regeneration apparatus is integrated in a coal gasification combined power generation unit.

4. A filter regeneration apparatus of a coal gasification system according to claim 3, wherein the controller, to which measured value of the internal temperature of the filter is inputted, controls the heating means to heat the filter to 400 to 450° C. based on the measured filter temperature and ashing gas oxygen adjusting means so that the oxygen concentration in the ashing gas reaches a target oxygen concentration of 5 to 15 vol. % based on the measured oxygen concentration, and wherein said controller also controls ashing gas flow adjusting means to stop feeding the ashing gas into the filter when a $CO_2$ concentration measured by a $CO_2$ meter reaches a predetermined target $CO_2$ concentration.

5. A filter regeneration apparatus according to claim 3, further comprising:

ashing gas flow adjusting means for adjusting flow of the ashing gas, wherein the controller controls at least one of the ashing gas flow adjusting means and an ashing gas oxygen adjusting means so that inputted oxygen concentration measured at the filter inlet reaches a target oxygen concentration.

6. A filter regeneration apparatus according to claim 3, further comprising at least one of:

differential pressure detecting means for detecting differential pressure between a filter inlet and a filter outlet; and a $CO_2$ meter for measuring a $CO_2$ concentration at the filter outlet, wherein the controller closes the ashing gas flow adjusting means to cut off the ashing gas being supplied to the filter when at least one of the following cases is detected:

a) a detected differential pressure inputted from the differential pressure detecting means reaches a preset target differential pressure;

b) the measured oxygen concentration inputted from the oximeter reaches a preset target oxygen concentration; or c) the measured $CO_2$ concentration inputted from the $CO_2$ meter reaches a preset target $CO_2$ concentration.

7. A filter regeneration apparatus according to claim 3, further comprising an inactive gas supplying means for supplying the inactive gas having the oxygen concentration of less than 5 vol. % to the filter.

8. A filter regeneration apparatus according to claim 3, further comprising an adjusting means for adjusting the oxygen concentration of the ashing gas in a range of 5 to 15 vol. %.

9. A filter regeneration apparatus according to claim 3, wherein the controller controls the filling means, heating means and feeding means so that after the filter is filled with the inactive gas and then heated to 400 to 450° C., the ashing gas is fed into the filter to ash the char in the filter.

10. A filter regeneration apparatus according to claim 3, further comprising:

a $CO_2$ meter for measuring a $CO_2$ concentration at the filter outlet, wherein the controller stops the flow of the ashing gas into the filter when a $CO_2$ concentration measured by the $CO_2$ meter reaches a predetermined target $CO_2$ concentration.

11. A filter regeneration apparatus according to claim 3, wherein the heating means comprises an electrical heater.

12. A filter regeneration apparatus of a coal gasification system having a filter for capturing char present in exhaust gas at an exhaust gas passage communicating with an exhaust gas source including a coal gasification furnace; the filter regeneration apparatus comprising:

temperature measuring means for measuring an internal temperature of the filter;

filling means for filling the filter with inactive gas having oxygen concentration of less than 5 vol. %;

heating means for heating the filter which is filled with the inactive gas based on the measured internal temperature of the filter so that the internal temperature of the filter is maintained at 400 to 450° C.;

oxidizing means for oxidizing char inside the filter by feeding ashing gas which is adjusted to have oxygen concentration of 5 to 15 vol. % into the filter;

$O_2$ concentration measuring means for measuring oxygen concentration in the ashing gas at a filter outlet; and a controller for controlling at least one of a flow of the ashing gas and an oxygen concentration in the ashing gas so that a measured value of the oxygen concentration reaches a preset target concentration; wherein the filter is in fluid communication with the coal gasification system to receive the gas containing residual char.

13. A filter regeneration apparatus according to claim 12, further comprising a hopper which collects char filtered out of the gas from the coal gasification system.

14. A filter regeneration apparatus comprising:
a filter for capturing char present in exhaust gas;
an exhaust gas passage fluidly interconnecting the filter with an exhaust gas source including a coal gasification furnace; and
a filter regenerating arrangement comprising:
heating means for heating the filter;
an oximeter for measuring oxygen concentration at an inlet of the filter;
oxygen adjusting means for adjusting an oxygen concentration in gas entering the filter;
temperature measuring means for measuring a temperature of the filter;
a $CO_2$ meter for measuring a $CO_2$ concentration at a filter outlet; and
a controller for controlling the heating means to heat the filter to 400 to 450° C. based on inputted filter temperature which is measured by the temperature measuring means, controlling the oxygen adjusting means so that oxygen concentration in the gas reaches a target oxygen concentration of 5 to 15 vol. % based on the measured oxygen concentration, and adjusting the oxygen adjusting means to cut off gas being supplied to the filter from the coal gasification furnace to adjust the oxygen concentration when the measured $CO_2$ concentration inputted from the $CO_2$ meter reaches a preset target $CO_2$ concentration.

* * * * *